(12) United States Patent
Ou et al.

(10) Patent No.: US 9,465,411 B2
(45) Date of Patent: Oct. 11, 2016

(54) ELECTRONIC DEVICE

(71) Applicant: TPV-INVENTA Technology Co., Ltd., Taipei (TW)

(72) Inventors: Sheng-Wen Ou, Taipei (TW); Hung-Chun Chen, Taipei (TW)

(73) Assignee: TPV-INVENTA TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 14/663,800

(22) Filed: Mar. 20, 2015

(65) Prior Publication Data

US 2016/0044807 A1    Feb. 11, 2016

(30) Foreign Application Priority Data

Aug. 8, 2014  (TW) .............................. 103214227 U

(51) Int. Cl.
*H05K 7/00*        (2006.01)
*G06F 1/16*        (2006.01)

(52) U.S. Cl.
CPC ........... *G06F 1/1658* (2013.01); *G06F 1/1613* (2013.01)

(58) Field of Classification Search
CPC ................ H01L 2224/48091; G06K 13/0831; G06K 13/0806; G06K 13/085; G06K 13/0856; H05K 5/0295
See application file for complete search history.

(56) References Cited

U.S. PATENT DOCUMENTS

| | | | | |
|---|---|---|---|---|
| 6,643,125 B2* | 11/2003 | Uchino | ................ | G06K 7/0082 361/679.32 |
| 8,462,514 B2* | 6/2013 | Myers | ................... | G06K 13/08 361/754 |
| 8,767,381 B2* | 7/2014 | Shukla | ................. | G06F 1/1658 361/679.01 |
| 2011/0255252 A1* | 10/2011 | Sloey | .................. | H04B 1/3816 361/752 |
| 2012/0224330 A1* | 9/2012 | Liu | .................... | G06K 13/0818 361/726 |
| 2013/0094162 A1* | 4/2013 | Tang | .................... | G06K 13/085 361/754 |
| 2013/0267106 A1* | 10/2013 | Jenks | ................... | G11B 17/00 439/160 |

* cited by examiner

*Primary Examiner* — Robert J Hoffberg
*Assistant Examiner* — Hung Dang
(74) *Attorney, Agent, or Firm* — Maschoff Brennan

(57) ABSTRACT

An electronic device includes a housing assembly and an electronic module. The housing assembly includes a first housing and a second housing. The first housing includes a main body, an accommodation box and an assembly component. The main body, the accommodation box and the assembly component are formed integrally into a single unit. The main body is connected to the accommodation box which has an accommodating space, a first side and a second side. The first side is opposite to the second side. The assembly component is disposed at the second side. The second housing detachably covers the accommodation box and the assembly component. The electronic module includes a fastening structure and is movably disposed in the accommodating space via the first side of the accommodation box. Accordingly, the fastening structure is combined with the assembly component.

8 Claims, 10 Drawing Sheets

ELECTRONIC DEVICE

CROSS-REFERENCE TO RELATED APPLICATIONS

This non-provisional application claims priority under 35 U.S.C. §119(a) on Patent Application No(s). 103214227 filed in Taiwan, R.O.C. on Aug. 8, 2014, the entire contents of which are hereby incorporated by reference.

BACKGROUND

1. Technical Field

The disclosure relates to an electronic device. More particularly, the disclosure relates to an electronic with an electronic module which can be disassembled rapidly.

2. Background

With the development of technology, the computational speeds of electronic devices become faster, the functions of the electronic devices have become richer, and the sizes of the electronic devices have become smaller. Thus, users utilize all kinds of electronic devices to meet their needs in their daily life.

For example, the users can communicate with other people or save/use all kinds of applications (Apps) by smartphones. Additionally, the users may work with their tablet computers, personal computers or laptop computers at their homes, schools, or offices, to finish their own works. Furthermore, the smartphones, the tablet computers, the personal computers and the laptop computers are capable of connecting with certain severs to access specific data.

However, it is becoming more difficult to actually distinguish or define different kinds of electronic devices from each other due to the development of technology. In other words, it's difficult to distinguish the smartphones from the tablet computers or distinguish the personal computers from the laptop computers clearly based on their sizes, functions or shapes.

For example, all-in-one computers (AIO) have been developed in recent years. A host of each all-in-one computer is disposed behind a display. Compared to the personal computers, sizes of the all-in-one computers are smaller, and the all-in-one computers are more aesthetically appealing than the personal computers (since displays and hosts of the personal computers are separated).

In prior art, each of the electronic devices (such as the all-in-one computers) comprises an optical disk drive (ODD) usually affixed to an installation frame by floating screws. When the users need to disassemble the optical disk drive, they have to disassemble the floating screws one by one first. However, it wastes too much time and the floating screws may be lost after loosening them. Moreover, it is hard to assemble or disassemble electronic modules from the all-in-one computers since there are too many components.

SUMMARY

One aspect of the disclosure provides an electronic device which comprises a housing assembly and an electronic module. The housing assembly comprises a first housing and a second housing. The first housing comprises a main body, an accommodation box and an assembly component. The main body, the accommodation box and the assembly component are formed integrally into a single unit. The main body is connected to the accommodation box which has an accommodating space, a first side and a second side. The first side is opposite to the second side. The assembly component is disposed at the second side. The second housing detachably covers the accommodation box and the assembly component. The electronic module comprises a fastening structure and is movably disposed in the accommodating space via the first side of the accommodation box. Accordingly, the fastening structure is combined with the assembly component.

BRIEF DESCRIPTION OF THE DRAWINGS

The disclosure will become more fully understood from the detailed description given herein-below and the accompanying drawings which are given by way of illustration only and thus are not limitative of the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
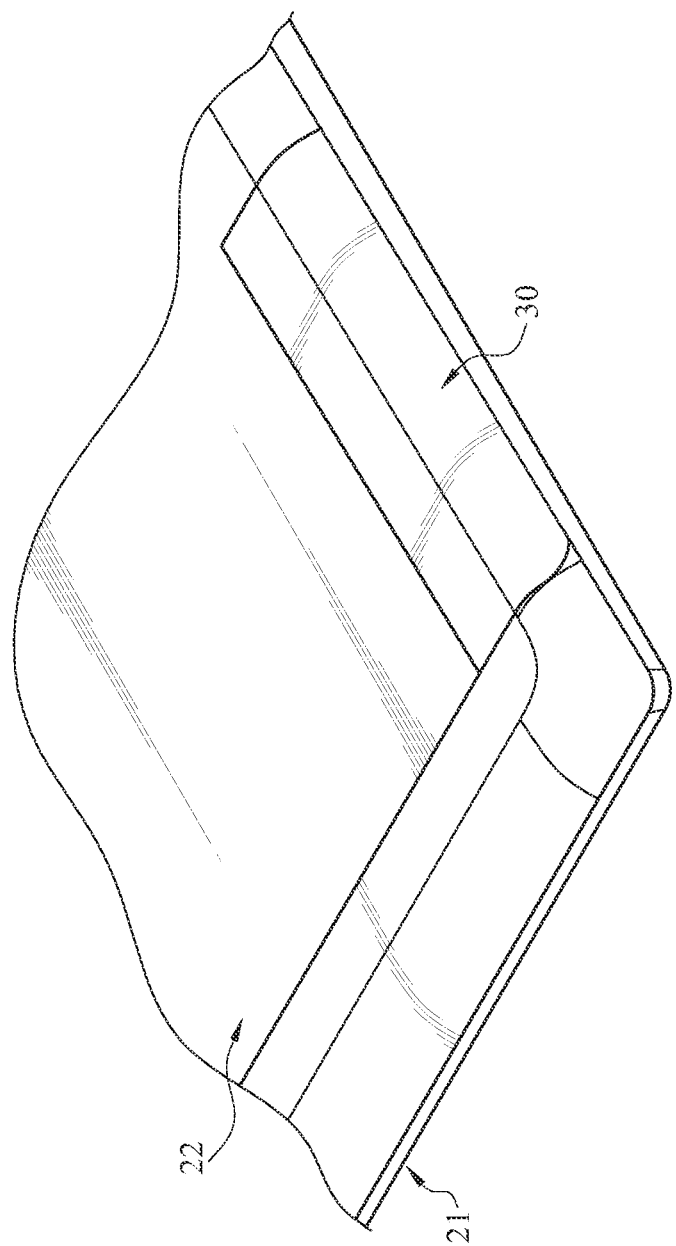
FIG. 1 is a perspective view of an electronic device according to an embodiment of the disclosure.
Figure 2:
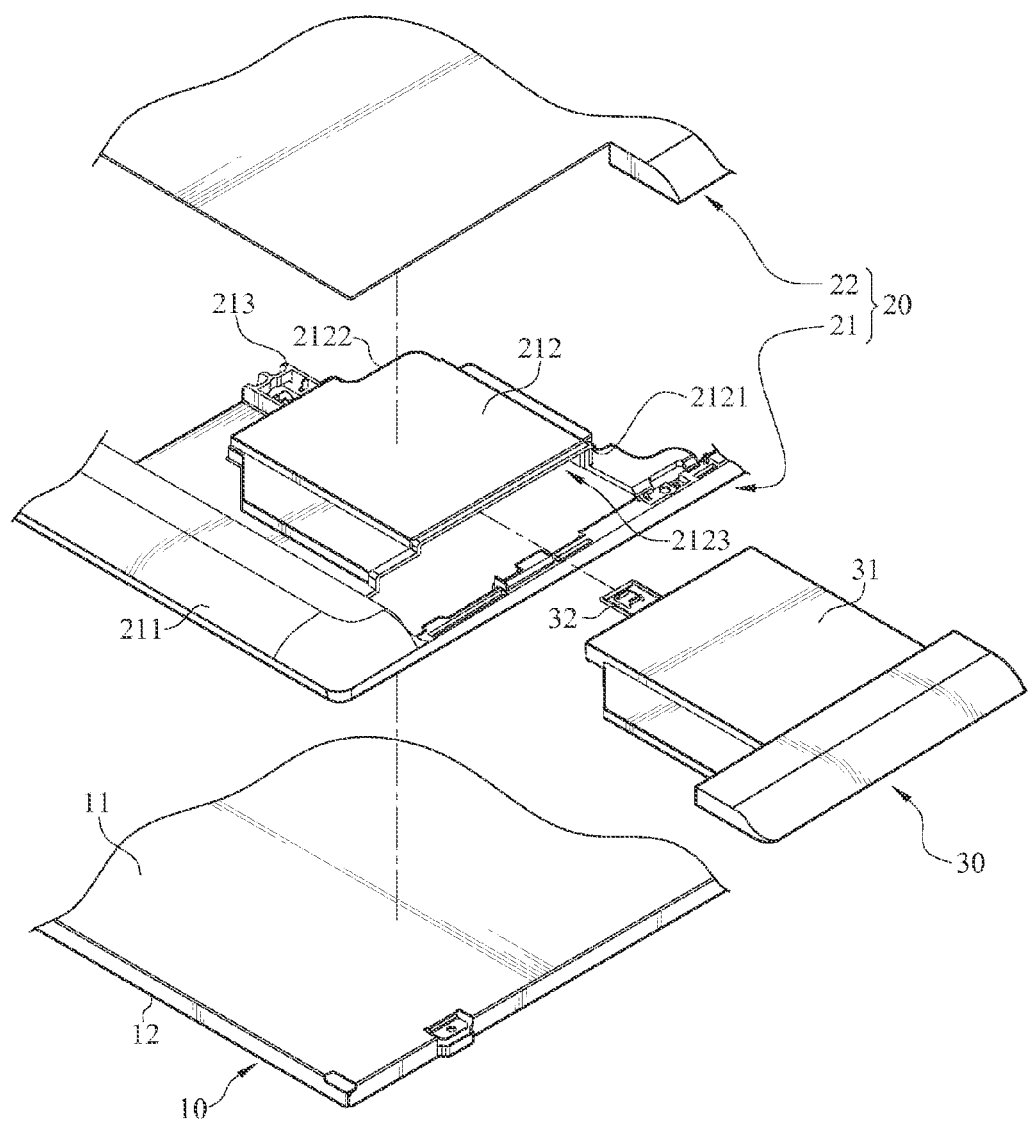
FIG. 2 is an exploded view of the electronic device in FIG. 1.

An electronic device of the disclosure will be described as follows. Please refer to FIG. 1 and FIG. 2. FIG. 1 is a perspective view of the electronic device according to an embodiment of the disclosure. FIG. 2 is an exploded view of the electronic device in FIG. 1. The electronic device 1 comprises a main frame 10, a housing assembly 20 and an electronic module 30. The main frame 10 has a first lateral surface 11 and a second lateral surface 12. The housing assembly 20 is disposed on and covers the first lateral surface 11 of the main frame 10. The housing assembly 20 comprises a first housing 21 and a second housing 22. The first housing 21 comprises a main body 211, an accommodation box 212 and an assembly component 213. The main body 211, the accommodation box 212 and the assembly component 213 are formed integrally into a single unit. The electronic module 30 is detachably assembled within an accommodating space 2123 that is formed in the accommodation box 212. Additionally, the electronic module 30 is electrically connected to a connection slot (not shown in FIGs.) disposed in the accommodation box 212.

In this embodiment, the electronic device 1 is an all-in-one (AIO) computer. That is, a display and a host (namely, a mother board and other electronic components) of the electronic device 1 are disposed in the same shell. Furthermore, the electronic module 30 is an optical disk drive (ODD) such as a CD-ROM, a DVD-ROM and a Blu-ray disc drive. However, the electronic device 1 is not limited to the all-in-one computer, and the electronic module 30 is not limited to the optical disk drive. In other embodiments, for example, the electronic device 1 is a tablet computer or a laptop computer, and the electronic module 30 is a hard disk drive (HDD), a solid-state drive (SSD) or an expansion card.

Each element of the electronic device 1 will be described as follows. Please refer to FIG. 1 and FIG. 2 again, the main frame 10 is adapted to be assembled with other elements of the electronic device 1. For example, the electronic module 30, a mother board (not shown in FIGs.), a hard disk drive (not shown in FIGs.), an expansion card (not shown in FIGs.), and a power supply (not shown in FIGs.) are all disposed on the first lateral surface 11 of the main frame 10, and a display module (not shown in FIGs.), a lens module (not shown in FIGs.), a radio module (not shown in FIGs.), and a speaker (not shown in FIGs.) are disposed on the second lateral surface 12 of the main frame 10.

The first housing 21 and the second housing 22 of the housing assembly 20 both cover the first lateral surface 11 of the main frame 10, to prevent the main frame 10 from exposing outward. The main body 211 is connected to the accommodation box 212. The assembly component 213 is disposed at the second side 2122. The second housing 22 detachably covers the accommodation box 212 and the assembly component 213, to prevent the accommodation box 212 and the assembly component 213 from exposing outward.

Figure 3:
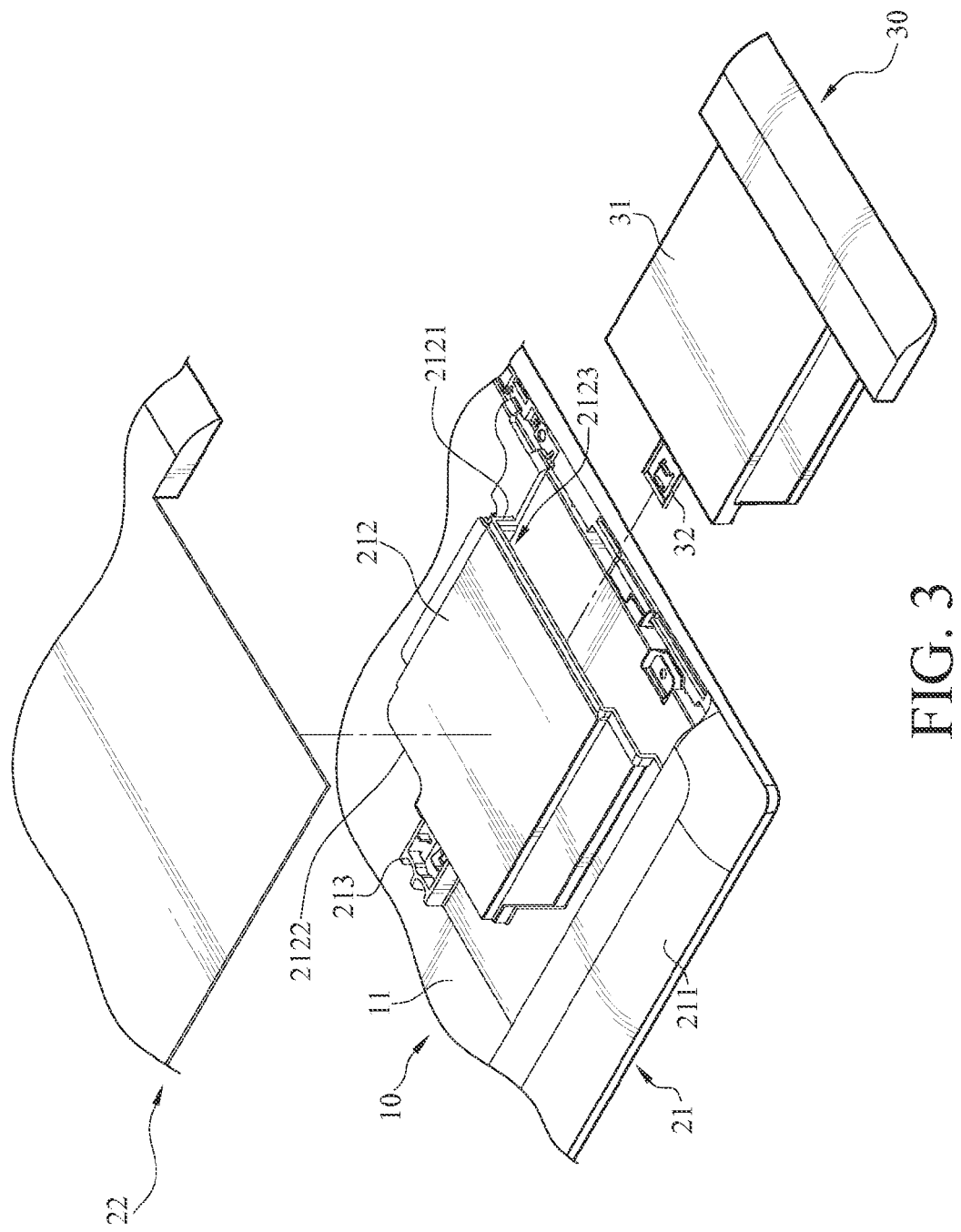
FIG. 3 is a perspective view according to the embodiment of the disclosure when a second housing and an electronic module are separated from a first housing.

Please refer to FIG. 2 and FIG. 3. FIG. 3 is a perspective view according to the embodiment of the disclosure when a second housing and an electronic module are separated from a first housing. In a process of assembling the housing assembly 20, firstly, the first housing 21 is disposed on the first lateral surface 11 of the main frame 10. Then, the second housing 22 is disposed on a part of the main frame 10 where is exposed, the assembly component 213 and the accommodation box 212 of the first housing 21.

Additionally, the accommodation box 212 of the first housing 21 has a first side 2121 and a second side 2122 which are opposite to each other. An opening formed by the second housing 22 and the first housing 21 is located at the first side 2121 of the accommodation box 212. Accordingly, the first side 2121 of the accommodation box 212 is exposed such that discs (when the electronic module 30 is an ODD) or other storage/expander devices can be inserted into or ejected from the accommodation box 212 via the opening by a user.

Figure 4:
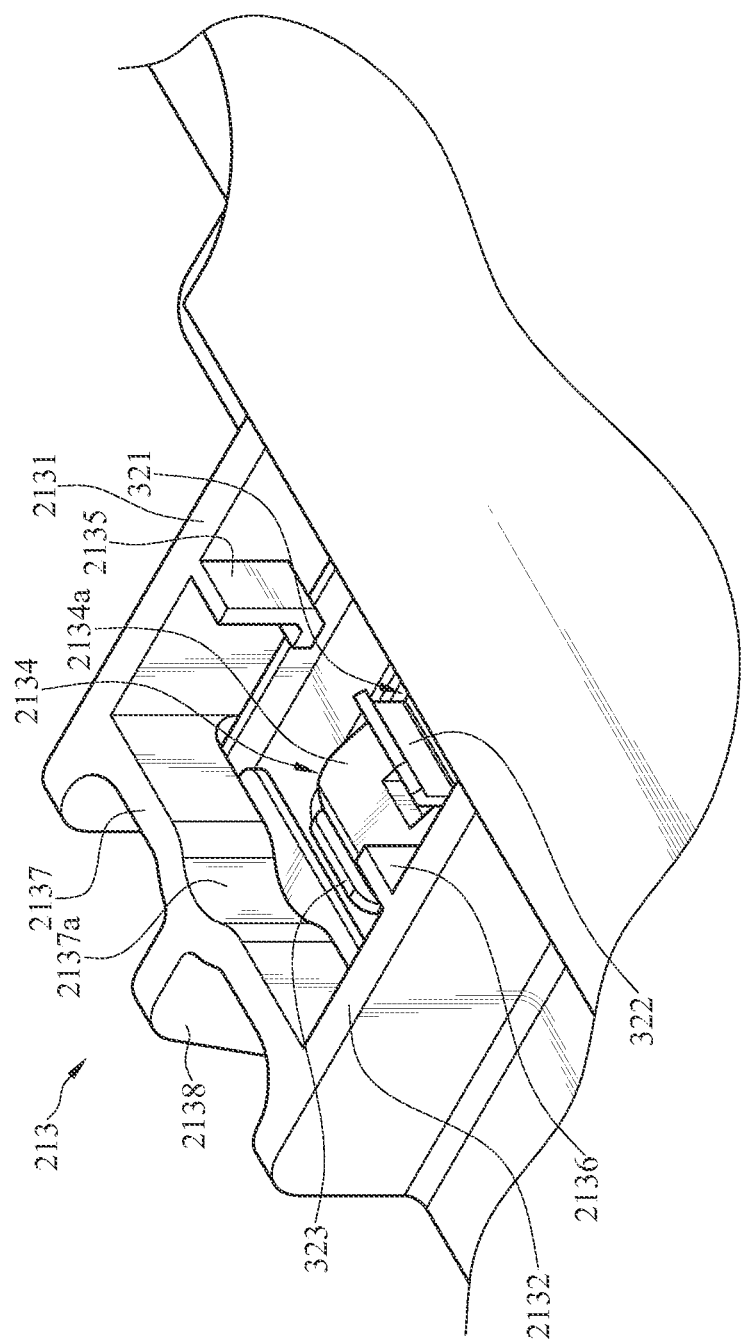
FIG. 4 is a partially perspective view of the electronic device according to the embodiment of the disclosure.
Figure 5:
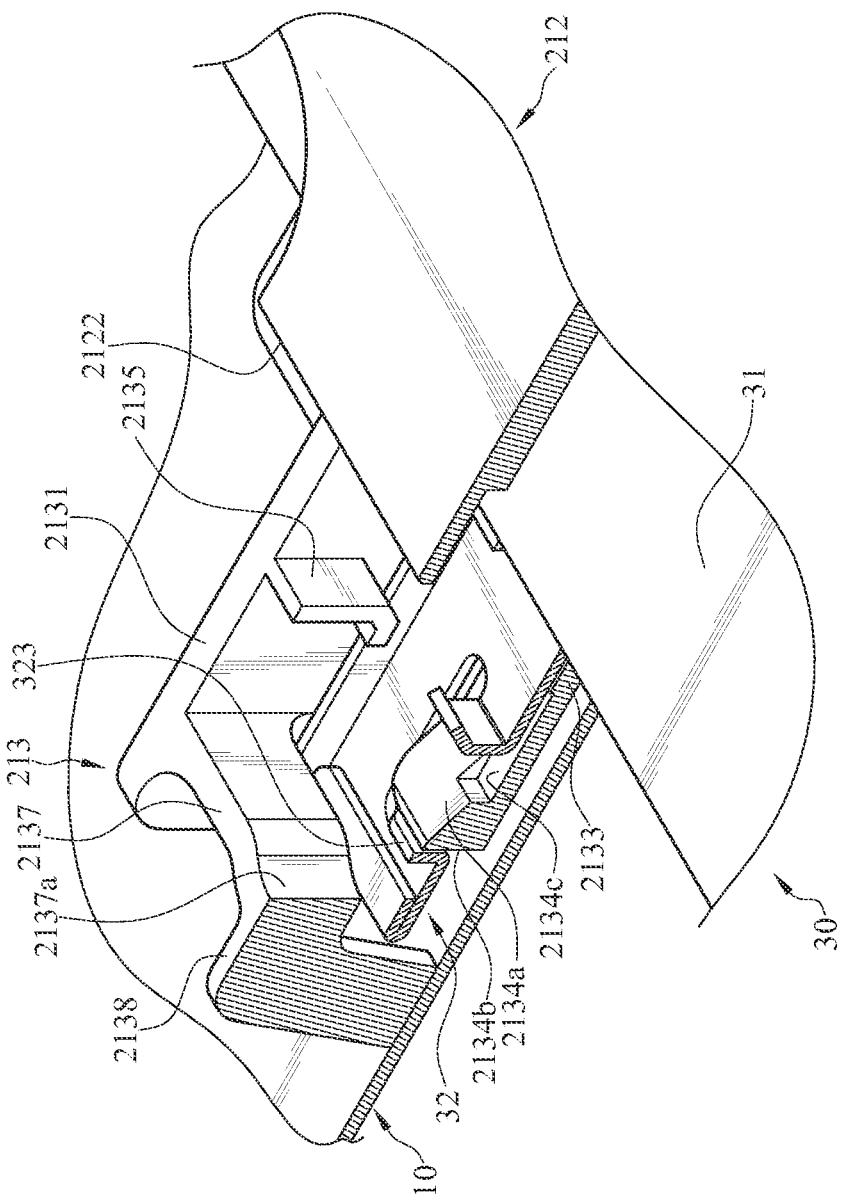
FIG. 5 is a partially sectional perspective view of the electronic device according to the embodiment of the disclosure.
Figure 6:
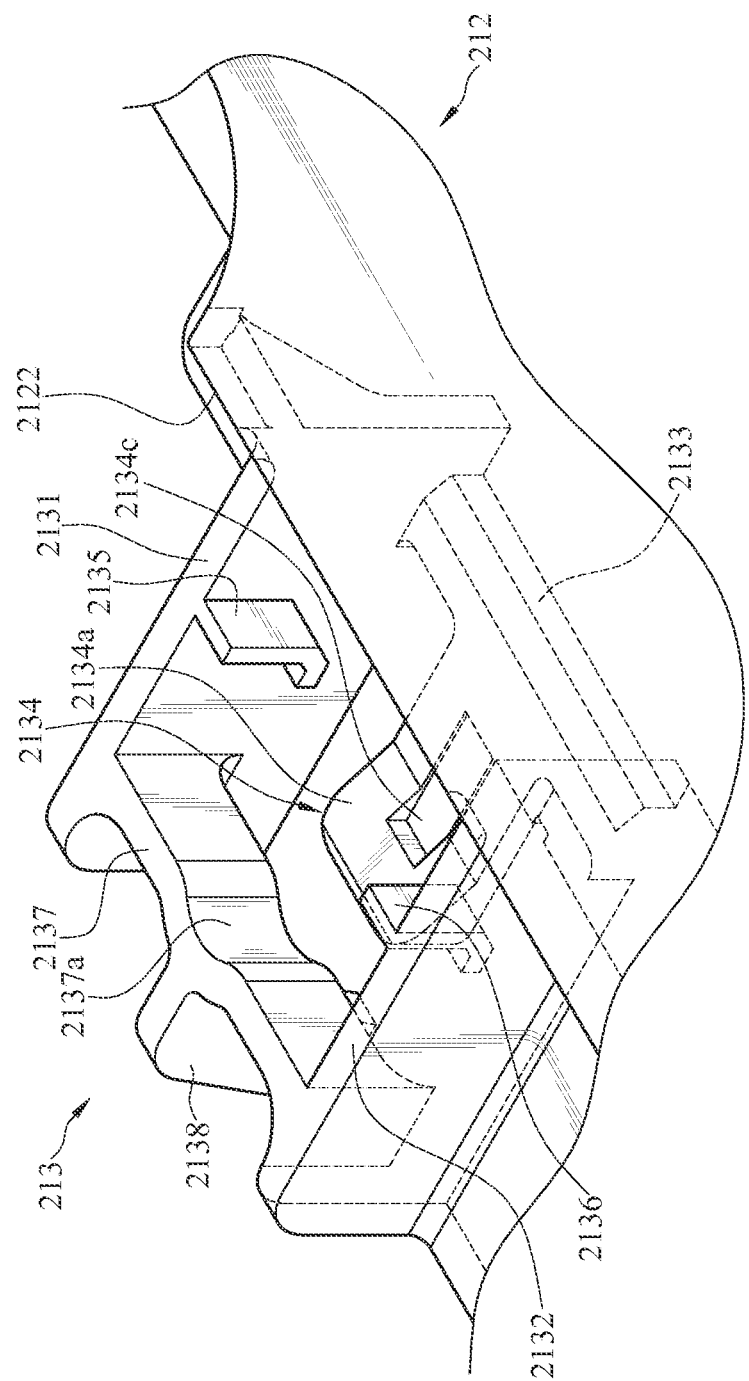
FIG. 6 is a partially perspective view of an accommodation box and an assembly component according to the embodiment of the disclosure.

The assembly component 213 of the first housing 21 will be described as follows. Please refer to FIG. 4, FIG. 5 and FIG. 6. FIG. 4 is a partially perspective view of the electronic device according to the embodiment of the disclosure. FIG. 5 is a partially sectional perspective view of the electronic device according to the embodiment of the disclosure. FIG. 6 is a partially perspective view of an accommodation box and an assembly component according to the embodiment of the disclosure. In this and some embodiments, the assembly component 213 comprises two side bars 2131 and 2132, a connecting rod 2133 with two ends, a hook part 2134, two positioning parts 2135, 2136, an outer wall part 2137 with two ends and a supporting part 2138.

The side bars 2131 and 2132 extend outward from the second side 2122 of the accommodation box 212, respectively. The two ends of the connecting rod 2133 are connected to the side bars 2131 and 2132, respectively. The hook part 2134 is disposed on the connecting rod 2133 and extends away from the accommodation box 212. In this and other embodiments, a thickness of the hook part 2134 is increased along a direction extending oppositely away from the accommodation box 212, so as to form an inclined plane 2134a and an erecting surface 2134b which are connected to each other. The inclined plane 2134a is facing to the accommodation box 212. Additionally, the hook part 2134 has a pressed slot 2134c located between the inclined plane 2134a and the accommodation box 212.

The positioning parts 2135 and 2136 are connected to the side bars 2131 and 2132, respectively, and the positioning part 2135 is facing to the positioning part 2136. The two ends of the outer wall part 2137 are connected to the side bars 2131 and 2132, respectively. The positioning parts 2135 and 2136 and the hook part 2134 are located between the outer wall part 2137 and the accommodation box 212. Additionally, the outer wall part 2137 has a recess structure 2137a which is facing to the hook part 2134. The supporting part 2138 is connected to the outer wall part 2137. Moreover, the supporting part 2138 is located at a side of the outer wall part 2137 opposite to the recess structure 2137a and extends toward the main frame 10. The supporting part 2138 is adapted to support the outer wall part 2137 and enhance the structural strength of the outer wall part 2137. When an external force is applied to the outer wall part 2137, the supporting part 2138 prevents the outer wall part 2137 from over deformation.

Figure 7:
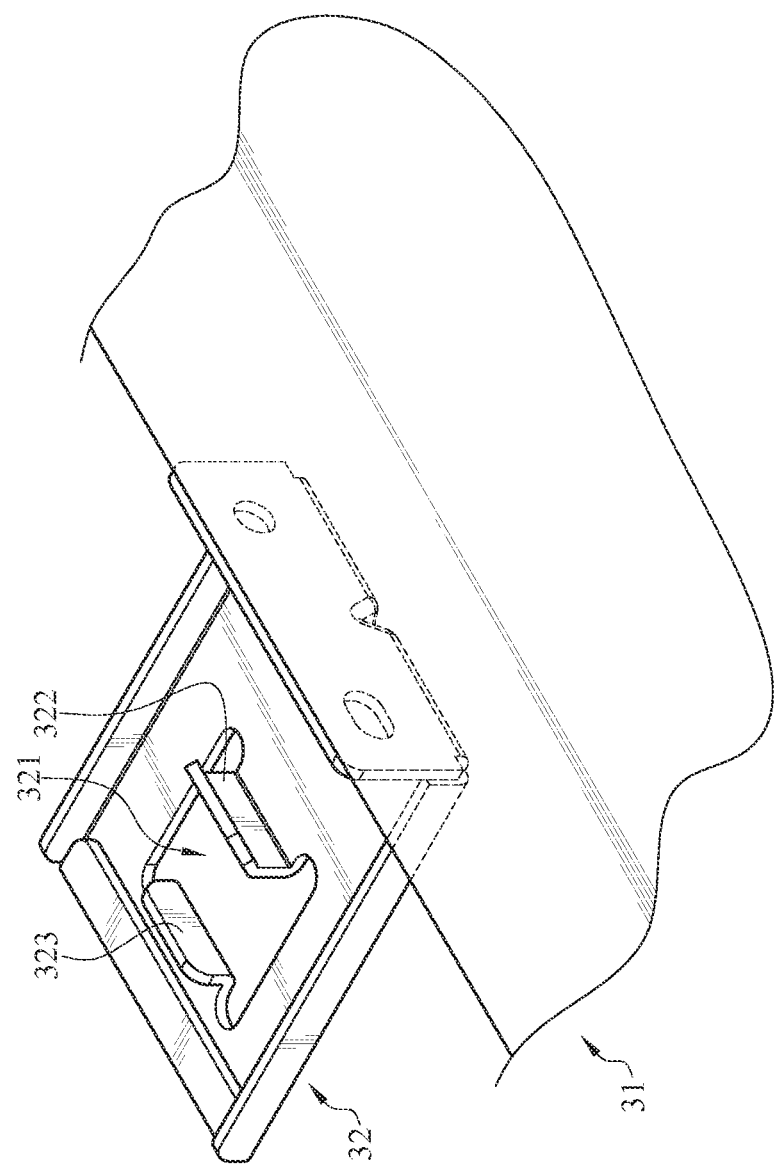
FIG. 7 is a partially perspective view of the accommodation box and the assembly component of the electronic module according to the embodiment of the disclosure.
Figure 8:
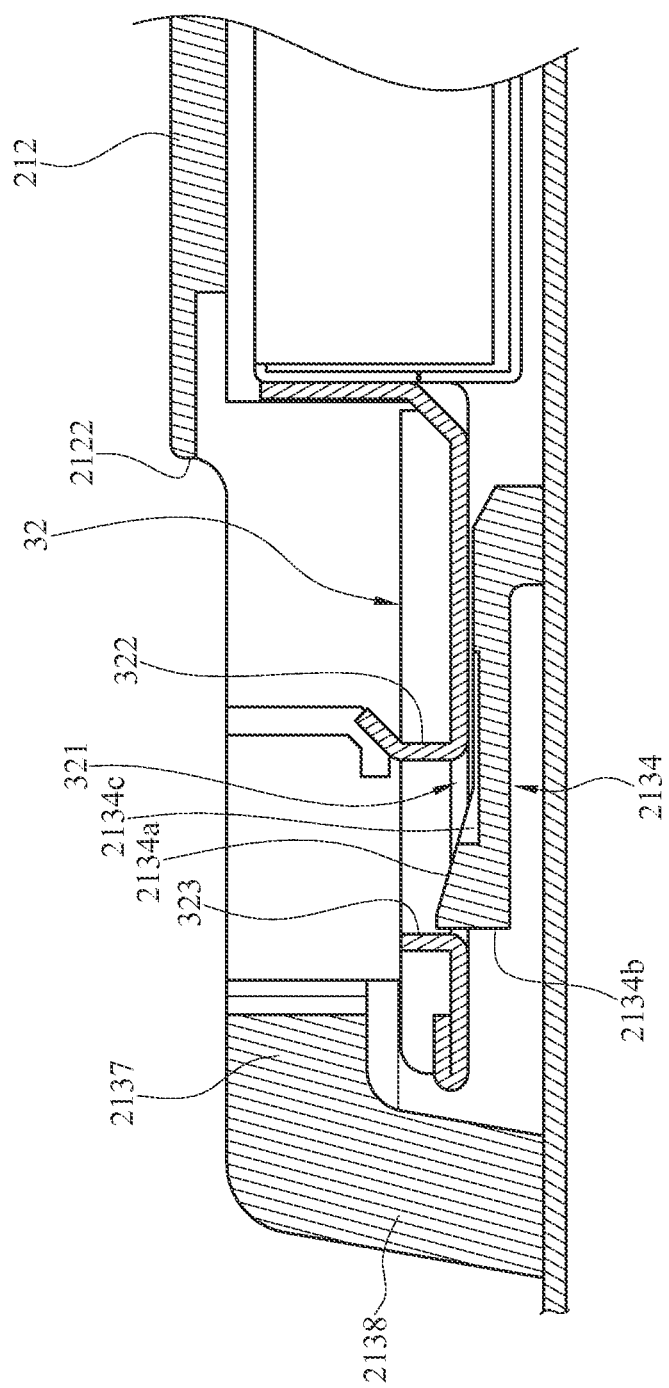
FIG. 8 is a sectional view according to the embodiment of the disclosure when the electronic module is assembled with the accommodation box.

The detailed structure of the electronic module 30 will be described as follows. Please refer to FIG. 4, FIG. 5, FIG. 7 and FIG. 8. FIG. 7 is a partially perspective view of the accommodation box and the assembly component of the electronic module according to the embodiment of the disclosure. FIG. 8 is a sectional view according to the embodiment of the disclosure when the electronic module is assembled with the accommodation box. The electronic module 30 comprises a module body 31 and a fastening structure 32 that is disposed at a side of the module body 31. The electronic module 30 is movably disposed in the accommodating space 2123 via the first side 2121 of the accommodation box 212, such that the fastening structure 32 is combined with the assembly component 213.

The detailed structure of the fastening structure 32 of the electronic module 30 will be described as follows. The fastening structure 32 has a fastening through hole 321, a pressed wall 322 and a resist wall 323. The pressed wall 322 and the resist wall 323 are erected at two sides of the fastening through hole 321, respectively, and the pressed wall 322 and the resist wall 323 are opposite to each other. Additionally, the fastening through hole 321 is detachably affixed to the hook part 2134 of the assembly component 213. The pressed wall 322 is near the pressed slot 2134c and erected at a side of the fastening through hole 321 near the accommodation box 212. The resist wall 323 is erected at a side of the fastening through hole 321 away from the accommodation box 212. When the fastening structure 32 is combined with the assembly component 213, the erecting surface 2134b of the hook part 2134 is pressed against the resist wall 323, so as to precisely position the electronic module 30 by the resist wall 323.

The process of assembling the electronic module 30 with the housing assembly 20 will be described as follows. Please refer to FIG. 3. First, the second housing 22 is dissembled, so as to expose the assembly component 213 of the first housing 21 and the fastening structure 32 of the electronic module 30. Then, please refer to FIG. 3 through FIG. 5. The electronic module 30 is inserted into the accommodating space 2123 of the accommodation box 212 via the first side 2121. At the same time, the fastening structure 32 penetrates through the second side 2122 from the accommodating space 2123, and the hook part 2134 is guided by the inclined plane 2134a. Accordingly, the hook part 2134 is fastened to the fastening through hole 321. Additionally, the resist wall 323 of the fastening structure 32 is pressed against the erecting surface 2134b, and the fastening structure 32 is positioned between the positioning parts 2135 and 2136 of the assembly component 213 and the connecting rod 2133, so as to improve the positional effect of the fastening structure 32 (as shown in FIG. 4, FIG. 5 and FIG. 8). Finally, the second housing 22 is disposed on and covers the accommodation box 212 of the first housing 21, the assembly component 213 and the fastening structure 32 of the electronic module 30. After all, the process of assembling the electronic module 30 with the housing assembly 20 is finished.

Figure 9:
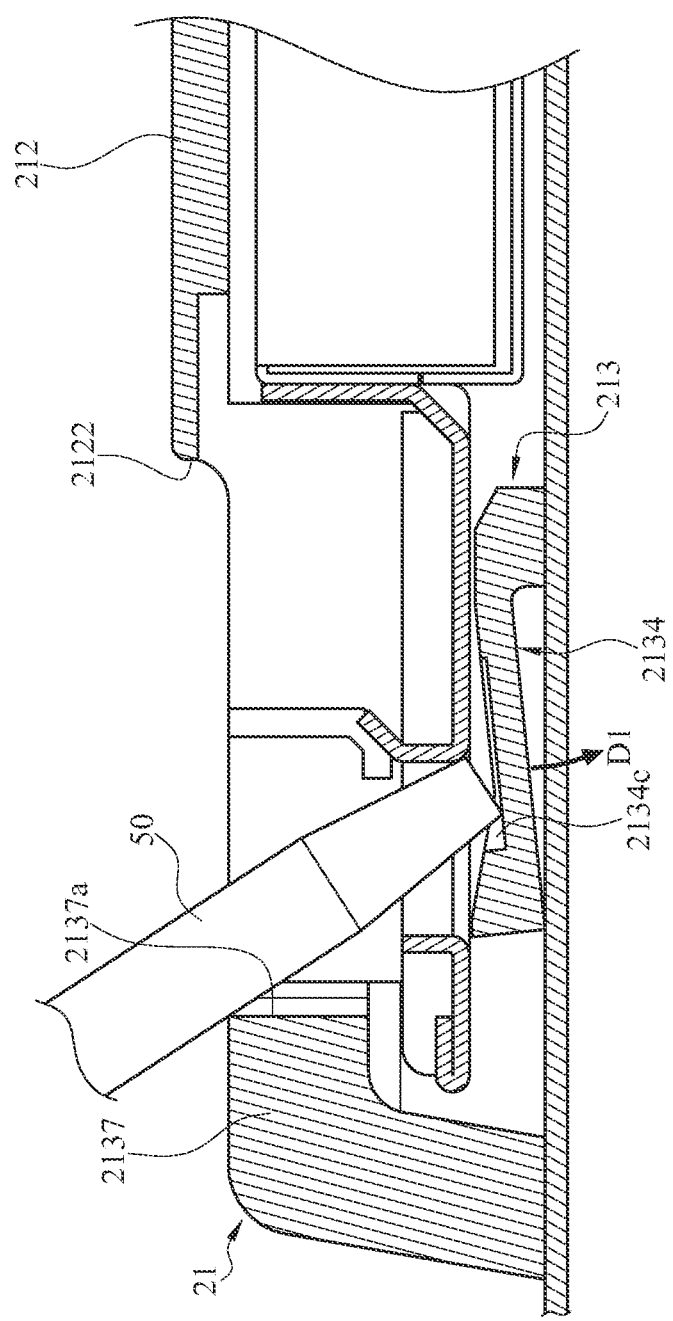
FIG. 9 is a sectional view according to an embodiment of the disclosure when a fastening structure of the electronic module is detached from a hook part.

The process of disassembling the electronic module 30 from the housing assembly 20 will be described as follows. Please refer to FIG. 3 and FIG. 9. FIG. 9 is a sectional view according to an embodiment of the disclosure when a fastening structure of the electronic module is detached from a hook part. First, the second housing 22 is disassembled, so as to expose the accommodation box 212 and the assembly component 213 of the first housing 21, and the fastening structure 32 of the electronic module 30. Then, a tool 50 (such as a pen or a screw driver) is adapted to press the fastening structure 32, so as to separate the fastening structure 32 from the hook part 2134 (as shown in FIG. 9) of the assembly component 213. Then, the tool 50 is adapted to press an end edge of the recess structure 2137a of the outer wall part 2137 and penetrates through the two sides bars 2131, 2132. Moreover, the pressed slot 2134c is pressed against the tool 50, so as to drive the hook part 2134 to move toward the main frame 10 along a first direction D1. Accordingly, the fastening structure 32 is separated from the hook part 2134. In this embodiment, the recess structure 2137a of the outer wall part 2137 is regarded as a fulcrum point for the tool 50, such that the user can apply a force to the hook part 2134 by employing lever principle. Moreover, the pressed slot 2134c is adapted to position the tool 50 usefully.

Figure 10:
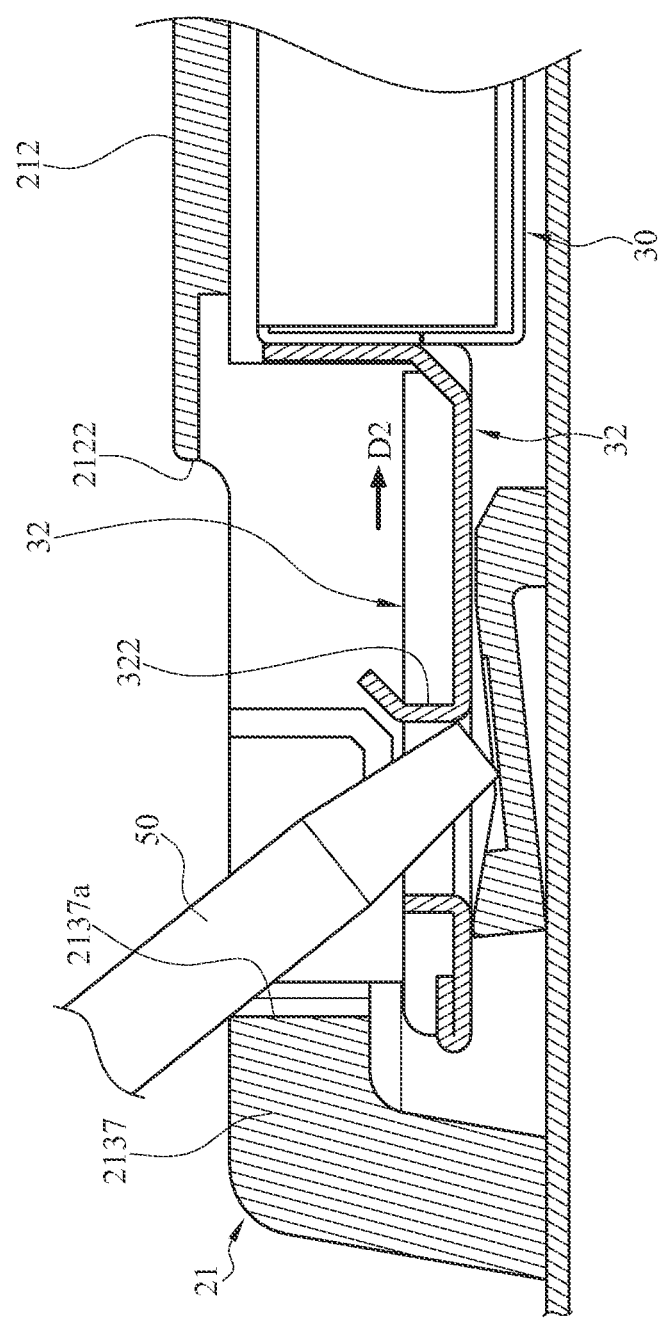
FIG. 10 is a sectional view according to an embodiment of the disclosure when the electronic module is disassembled from the accommodation box.

Then, please refer to FIG. 2 and FIG. 10. FIG. 10 is a sectional view according to an embodiment of the disclosure when the electronic module is disassembled from the accommodation box. When the tool 50 rotates counterclockwise about the end edge of the recess structure 2137a of the outer wall part 2137 as the fulcrum point (namely, an end of the tool 50 is lifted up by employing lever principle), the pressed wall 322 is pressed by the tool 50 so as to drive the electronic module 30 to move toward the first side 2121 (along a second direction D2) from the second side 2122. When a part of the electronic module 30 is separated from the accommodation box 212, the user can take out the electronic module 30 from the first side 2121 directly. As a result, the process of disassembling the electronic module 30 form the housing assembly 20 is finished.

According to the electronic device of the disclosure, the first housing is integrally formed by combining the accommodation box where the electronic module with the assembly component and the main body. Thus, the quantity of elements and the weight of the electronic device can be decreased, and the assembly process of the electronic device can be simplified. Nonetheless, the electronic module is fastened by the fastening structure and the assembly component of the first housing. The user can use a tool to press the hook part of the fastening structure, so as to separate the fastening structure from the assembly component, and therefore the electronic module is left from the first housing. Accordingly, the electronic device is assembled or disassembled easily by the user.

The disclosure will become more fully understood from the said embodiment for illustration only and thus does not limit the disclosure. Any modifications within the spirit and category of the disclosure fall in the scope of the disclosure.

What is claimed is:

1. An electronic device, comprising:
   a housing assembly comprising:
      a first portion of an enclosure comprising a main body, an accommodation box and an assembly component, wherein the main body, the accommodation box and the assembly component are formed integrally into a single unit, the main body is connected to the accommodation box which has an accommodating space, a first side and a second side, the first side is opposite to the second side, and the assembly component is disposed at the second side; and
      a second portion of an enclosure detachably covering the accommodation box and the assembly component; and
      an electronic module comprising a fastening structure and being movably disposed in the accommodating space via the first side of the accommodation box, such that the fastening structure is combined with the assembly component, wherein the assembly component comprises two side bars, a connecting rod with two ends, a hook part and two positioning parts, the two side bars extends outward from the second side of the accommodation box respectively, the two ends of the connecting rod are connected to the two side bars respectively, the hook part is disposed on the connecting rod and extends away from the accommodation box, the two positioning parts are connected to the two side bars respectively and facing to each other, and the fastening structure is located between the two positioning parts and the connecting rod.

2. The electronic device according to claim 1, wherein the fastening structure of the electronic module further has a fastening through hole detachably affixed to the hook part of the assembly component.

3. The electronic device according to claim 2, wherein the fastening structure of the electronic module further comprises a resist wall erected at a side of the fastening through hole away from the accommodation box, and the resist wall is pressed against the hook part.

4. The electronic device according to claim 3, wherein a thickness of the hook part is increased along a direction extending oppositely away from the accommodation box, so as to form an inclined plane and an erecting surface which are connected to each other, the inclined plane is facing to the accommodation box and adapted to guide the hook part to move, and the erecting surface is facing to the resist wall and adapted to be pressed against the resist wall.

5. The electronic device according to claim 2, wherein the fastening structure of the electronic module further has a pressed wall erected at a side of the fastening through hole near the accommodation box.

6. The electronic device according to claim 5, wherein the hook part has a pressed slot near the pressed wall.

7. The electronic device according to claim 1, wherein the assembly component further comprises an outer wall part with two ends, the two ends of the outer wall part are connected to the two side bars respectively, and the outer wall part has a recess structure which is facing to the hook part.

8. The electronic device according to claim 7, wherein the assembly component further comprises a supporting part connected to the outer wall part and located at a side of the outer wall part opposite to the recess structure.

* * * * *